United States Patent [19]
Giacomelli

[11] Patent Number: 5,564,255
[45] Date of Patent: Oct. 15, 1996

[54] APPARATUS AND METHOD FOR SEALING AND CREASING GABLED CONTAINERS

[75] Inventor: Peter Giacomelli, Buffalo Grove, Ill.

[73] Assignee: Tetra Laval Holdings & Finance S.A., Pully, Switzerland

[21] Appl. No.: 315,411

[22] Filed: Sep. 28, 1994

[51] Int. Cl.⁶ .................................................. B65B 51/10
[52] U.S. Cl. ...................... 53/371.2; 53/565; 53/DIG. 2
[58] Field of Search ............................. 156/580, 580.1, 156/580.2, 75.1; 53/371.2, 374.2, 565, DIG. 2

[56] References Cited

U.S. PATENT DOCUMENTS

| | | | |
|---|---|---|---|
| 3,789,746 | 2/1974 | Martenson et al. | 93/39.2 |
| 3,956,046 | 5/1976 | Tsuchiya et al. | 53/DIG. 2 |
| 4,159,220 | 6/1979 | Bosche et al. | 53/374.2 |
| 4,403,465 | 9/1983 | Basche | 53/DIG. 2 |
| 4,406,720 | 9/1983 | Wang et al. | 156/580.2 |
| 4,603,535 | 8/1986 | Schultheis | 53/374.2 |

*Primary Examiner*—John Sipos
*Assistant Examiner*—Gene L. Kim
*Attorney, Agent, or Firm*—McAndrews, Held & Malloy, Ltd.; Patrick N. Burkhart

[57] ABSTRACT

A sealing device is set forth which assists in overcoming the foregoing problems. The sealing device includes a first sealing jaw for sealing a fin of the gabled container. A second sealing jaw is disposed opposite the first sealing jaw. Both the first and second sealing jaws include a generally flat face portion. The second sealing jaw further includes a sealing bar extending from a mid-region of its generally flat face portion lengthwise along at least a portion thereof for sealing the fin of the gabled container with, for example, ultrasonic energy. A ridge extends respectively from each of the generally flat face portions at a position to form a fin base crease at the base of the fin, for example, over the existing weak crease at the base of the fin. The fin base crease assists in preventing separation at the base of the fin below the principal horizontal seal formed by the sealing bar. The sealing bar may extend from the generally flat face portion of the second jaw a distance beyond the degree to which the ridges extend from their respective face portions. The ridges thus may exert less pressure on the fin than does the sealing bar.

11 Claims, 4 Drawing Sheets

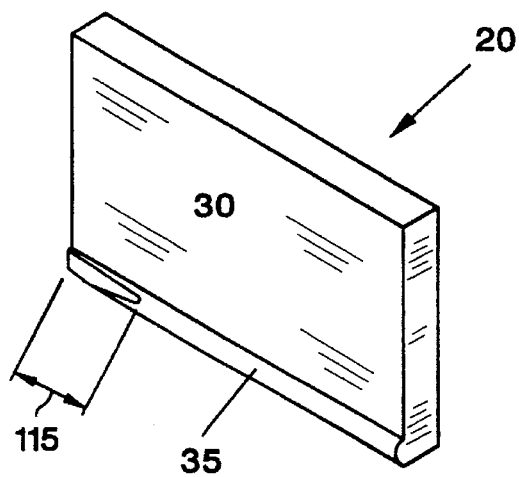
FIG. 1
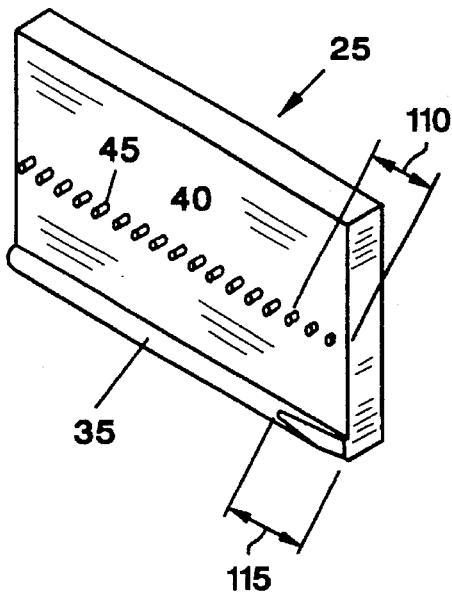
FIG. 2
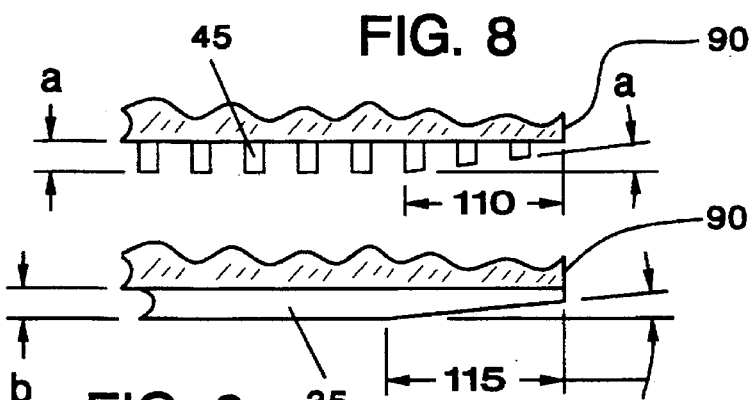
FIG. 8
a > b
FIG. 9

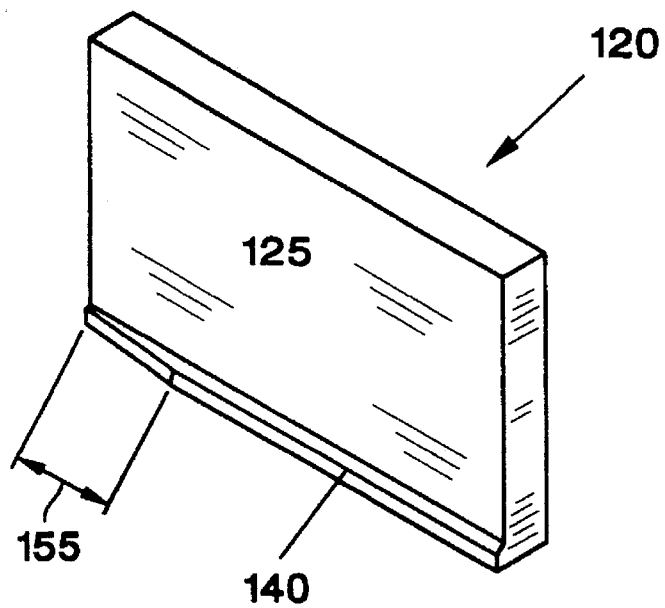
FIG. 10
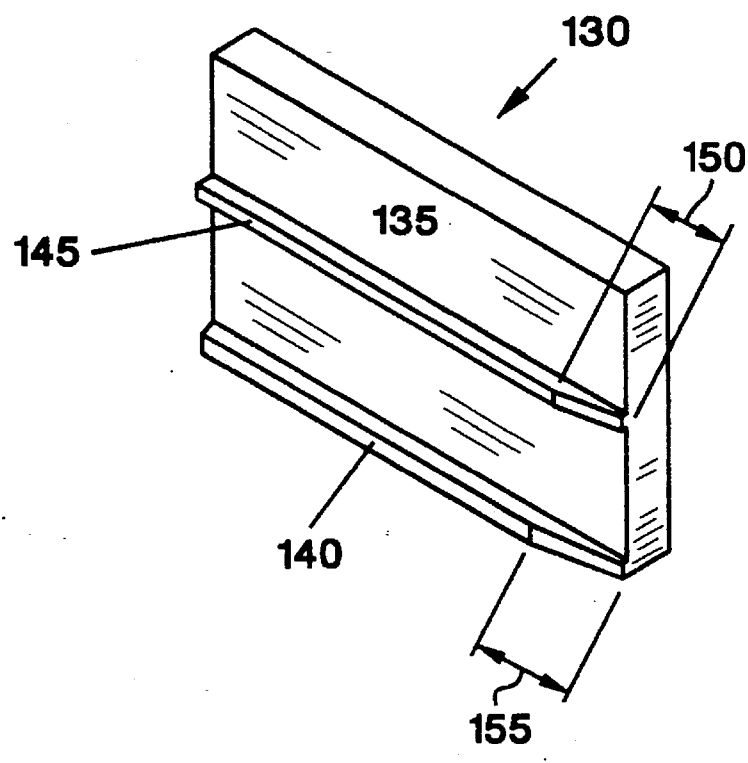

APPARATUS AND METHOD FOR SEALING AND CREASING GABLED CONTAINERS

TECHNICAL FIELD

The present invention relates to an apparatus for sealing and creasing a fin of a gabled container. Specifically, the invention relates to a sealing configuration on the face of one or more sealing jaws that both seals the fin and further, forms a fin base crease that assists in maintaining the integrity of the fin shape and seal.

BACKGROUND

Gable top cartons have been known for the better part of the twentieth century. Their characteristic simplicity and resealability have helped to sustain their popularity as cartons for traditional liquid food products such as milk and juice, but in recent years they have been used for products ranging from ammunition to Epsom salts. Gable top cartons typically start out as generally rectangular carton blanks made of creases to facilitate folding and forming the blank into a carton.

During decades of development, manufacturers of packaging machines have devised a variety of ways to form, fill, and seal gable top cartons. Today, the most prevalent packaging machines for filling and sealing gable top cartons are adapted to receive the carton blank after it has been side sealed. The process of side sealing involves sealing opposite vertical edges of the carton blank together to form a polygonal (usually rectangular) sleeve. The sleeve is received on an indexable mandrel wheel which rotates the sleeve into respective positions where the end of the sleeve extending outwardly from the mandrel is folded and sealed to form the bottom of the carton.

After the carton bottom has been formed, it is removed from the mandrel and transported to a filling station where the carton is filled with product. Once the canon has been filled, the top of the carton is folded into the familiar gable top configuration and is heat sealed, thus completing the packaging process.

One example of a known packaging machine that operates generally in accordance with these principles is described in U.S. Pat. No. 3,789,746 to Martensson et at. Other examples of such packaging machines are described in U.S. Pat. No. 3,820,303 to Martensson et al.; U.S. Pat. No. 4,759,171 to Braveris et al., and U.S. Pat. No. 4,790,123 to Ljungstrom et al. These patents are hereby incorporated by reference.

Various mechanisms are known for sealing the fin at the gabled end of the gable top carton. One such mechanism is disclosed in U.S. Pat. No. 3,200,557 to Schwenk. In accordance with the teachings of that patent, the upper flap panels that form the gabled structure, including the fin, are first heated to allow the polyethylene coating on the cartons to soften. The carton is then transported to a position between two sealing jaws. The sealing jaws move toward one another and apply pressure to form and seal the fin.

Fins that are sealed in accordance with the teachings of the foregoing patents have a tendency to separate in the region below the principal horizontal seal. Additionally, the process of heat sealing the fin of the gabled container can be time consuming and limits the throughput of the packaging machine. An improved sealing apparatus is therefore desirable.

SUMMARY OF THE INVENTION

A sealing device is set forth which assists in overcoming the foregoing problems. The sealing device includes a first sealing jaw for sealing a fin of the gabled container. A second sealing jaw is disposed opposite the first sealing jaw. Both the first and second sealing jaws include a generally flat face portion. The second sealing jaw further includes a sealing bar extending from a mid-region of its generally flat face portion lengthwise along at least a portion thereof for sealing the fin of the gabled container with, for example, ultrasonic energy. A ridge extends respectively from each of the generally flat face portions at a position to form a fin base crease at the base of the fin, for example, over the existing weak crease at the base of the fin. The fin base crease assists in preventing separation at the base of the fin below the principal horizontal seal formed by the sealing bar. The sealing bar may extend from the generally flat face portion of the second jaw a distance beyond the degree to which the ridges extend from their respective face portions. The ridges thus may exert less pressure on the fin than does the sealing bar.

In accordance with a further embodiment of the sealing jaws, the sealing bar is replaced by a plurality of generally circular sealing extensions. By using a plurality of generally circular sealing extensions, it becomes possible to better regulate the amount of ultrasonic energy transmitted to the fin, thereby providing the ability to make the heat sealing process more time and energy efficient.

In accordance with a still further embodiment of the sealing jaws, the degree to which the ridges and circular extensions protrude from the generally flat face portions is reduced proximate the opening end of the fin. This facilitates opening of the gabled container while ensuring proper fin sealing.

A method of using the sealing jaws and a gable top configuration sealed with the sealing jaws are likewise contemplated. Other advantages of the present invention will become apparent upon reference to the accompanying detailed description in conjunction with the following drawings.

BRIEF DESCRIPTION OF THE DRAWINGS

FIG. 1 is a perspective view of a first jaw.

FIG. 2 is a perspective view of a second jaw.

FIG. 8 is a top plan view of the second jaw showing the sealing extensions.

FIG. 9 is a top plan view of the first jaw showing the ridge extension.

FIG. 10 is a perspective view of an alternative embodiment of the first and second jaws.

DETAILED DESCRIPTION OF THE PREFERRED EMBODIMENT

Figure 3:
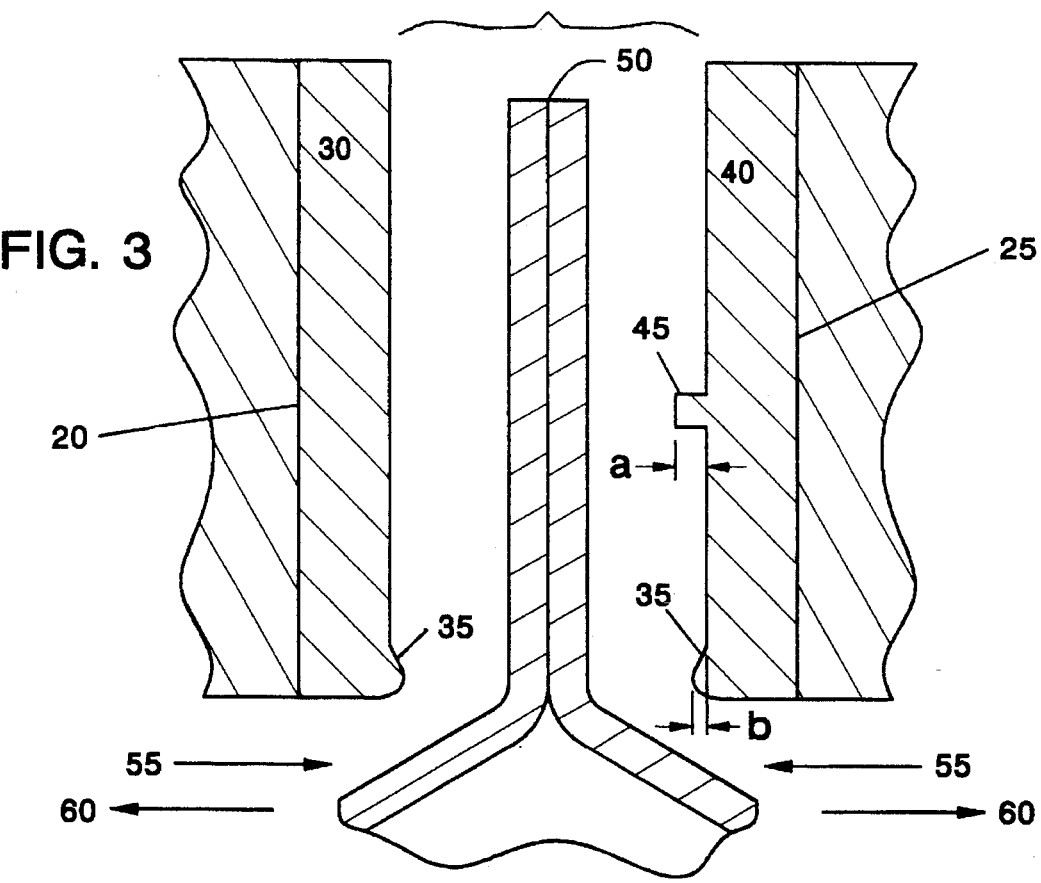
FIG. 3 is a side view of the first and second jaws in an opened condition with a fin disposed therebetween.

FIGS. 1 and 2 illustrate a first jaw 20 and a second jaw 25 respectively. The first and second jaws 20, 25 may be used in an ultrasonic sealing mechanism such as the one disclosed in U.S. Ser. No. 08/315,412, entitled "Ultrasonic Carton Sealer", filed on even date herewith, and which is hereby incorporated by reference. As illustrated, the first jaw 20 includes a generally flat face portion 30. A ridge 35 extends outwardly from the generally flat face portion 30 at a lower region thereof.

The second jaw 25 likewise includes a generally flat face portion 40. A ridge 35 extends outwardly from the generally flat face portion 40 at a lower region thereof. A plurality of generally circular sealing extensions 45 extend outwardly from the generally flat face portion 40 in a region disposed above the ridge 35. The degree to which the sealing extensions 45 extend from the face portion 40 is greater than the degree to which the ridges 35 extend from their respective face portions 30 and 40.

Figure 4:
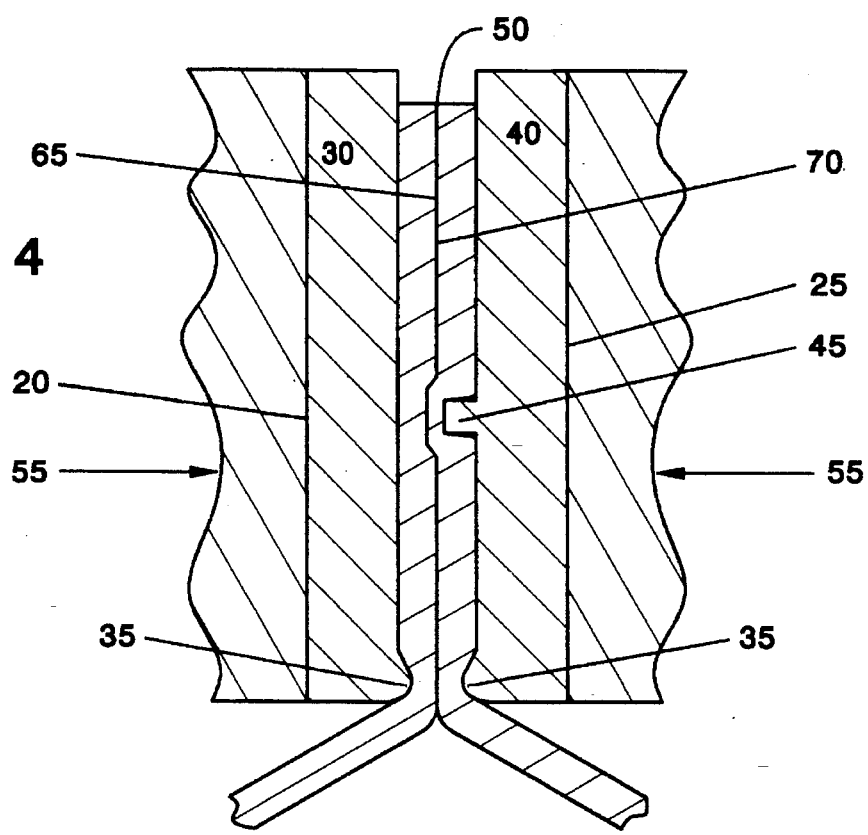
FIG. 4 is a side view showing the jaws of FIG. 3 in the closed position engaging the fin a of gabled container.

FIGS. 3 and 4 illustrate the relative position of the first jaw 20 and second jaw 25 in an open condition with a fin 50 of a gabled container disposed therebetween. As illustrated, the generally circular sealing extensions 45 are disposed proximate a mid-region of the fin while the ridges 35, illustrated here as having a generally curved cross-section, reach an apex that is disposed proximate the base of the fin 50. The juxtaposed jaws 20 and 25 are movable toward one another in the directions illustrated by arrows 55 and away from one another in the direction illustrated by arrows 60.

FIG. 4 illustrates the jaws 20 and 25 in a closed state. In this closed state, the jaw 25, which may, for example, be an ultrasonic horn, transmits ultrasonic energy to the fin 50 for a predetermined period of time which causes the polyolefin barrier layers of juxtaposed fin contacting surfaces 65 and 70 to soften so that the surfaces may be joined together in the area of the generally circular extensions 45. Use of the plurality of generally circular sealing extensions, as opposed to a single ridge, facilitates a high degree of control over the amount of ultrasonic energy used to seal the fin 50. Such control, further, reduces the amount of time required to cool the fin 50 after the predetermined period of time in which ultrasonic energy is applied.

At the same time that a seal is formed by the circular extensions 45, the ridges 35 engage the base of the fin to form a crisp fin base crease, for example, over the existing weak creases at to the base of the fin. Due to the difference in the degree to which the ridges 35 and sealing extensions 45 extend, the pressure applied by the ridges 35 to form the crisp fin base crease is less than the pressure applied by the circular extension 45. As such, the amount of ultrasonic energy transmitted to the fin 50 in the base region is less than the amount of ultrasonic energy transmitted to the fin in the sealing region.

Figure 5:
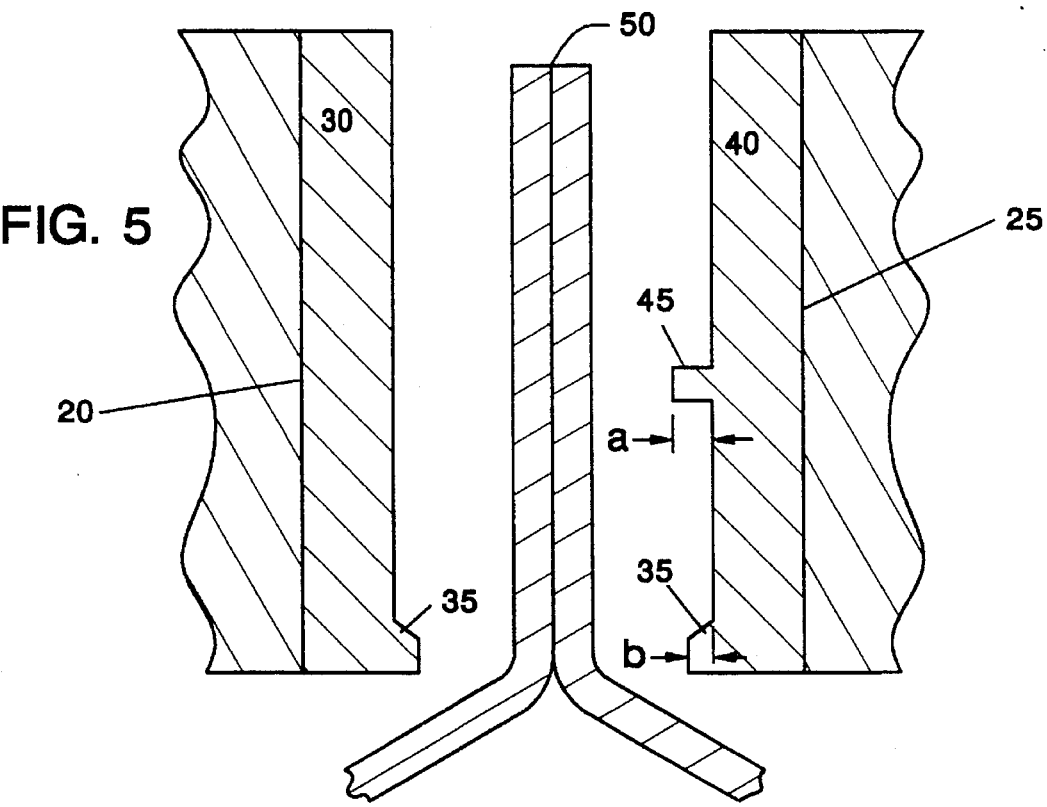
FIG. 5 is a side view of a further embodiment of the first and second jaws.

FIG. 5 illustrates a further embodiment of the first and second jaws 20 and 25. In this embodiment, the ridges 35 have a trapezoidal cross-section which may, for example, provide a more defined crease than the ridges 35 illustrated in FIGS. 3 and 4. As in the previous embodiment, the ridges do not extend to the same degree as the sealing extensions.

Figure 6:
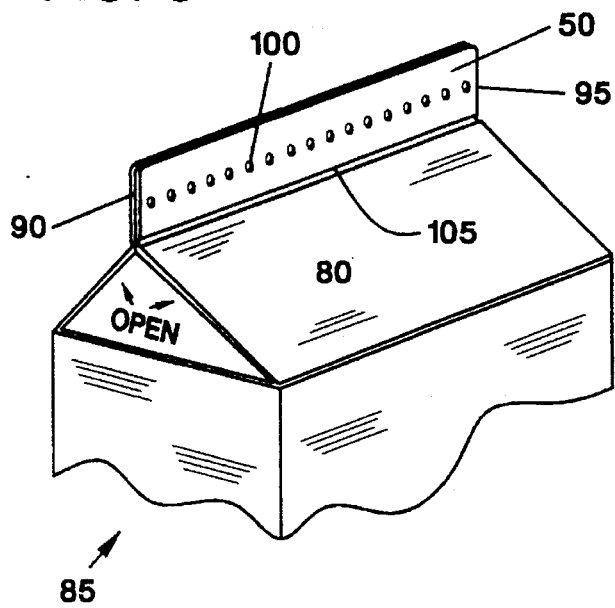
FIG. 6 and 7 illustrate a fin that has been sealed using the disclosed sealing jaws.
Figure 7:
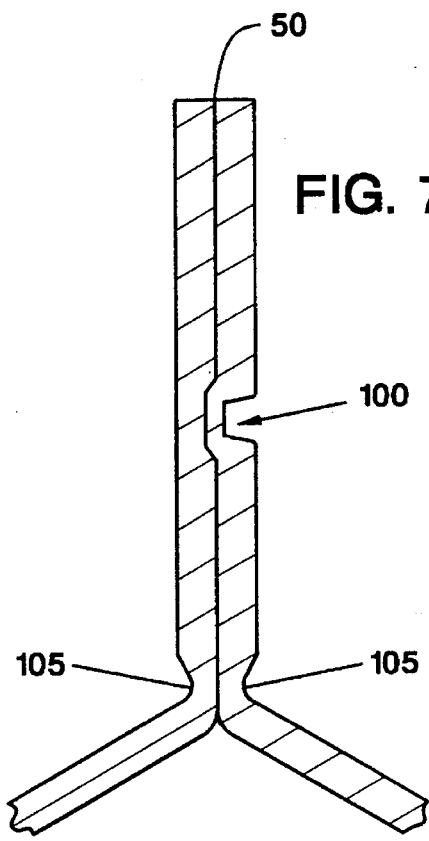

FIGS. 6 and 7 illustrate the gabled end 80 of a container 85 wherein the fin 50 has been sealed with the disclosed first and second sealing jaws 20 and 25. As illustrated, the fin 50 extends lengthwise from an opening end 90 to a closed end 95. A plurality of circular sealing regions 100 are disposed lengthwise along the mid-portion of the fin to form the primary, seal. The fin base crease 105 extends lengthwise along the base of the fin 50.

A uniform seal along the length of the fin may not be desirable where, for example, the gabled top has an opening end and a closed end. Rather, it may be desirable to provide a seal that is more easily opened at the opening end 90 than the closed end 95. FIGS. 8 and 9 illustrate modifications to the circular extensions 45 and ridges 35 to accomplish this goal. As illustrated, the generally circular extensions taper to a diminished degree of extension in region 110 while the ridges 35 likewise taper to a diminished degree of extension in region 115. Regions 110 and 115 are disposed proximate the opening end 90 of the fin when the first and second jaws 20 and 25 are closed to seal and crease the fin 50. Less ultrasonic energy will thus be applied in the regions 110 and 115 thereby providing a seal at the opening end 90 that is more readily broken than the seal at the closed end 95.

An alternative embodiment of the first and second jaws 120 and 130 is illustrated in FIG. 10. Both the first and second jaws 120 and 130 include a generally flat face portion 125 and 135 respectively. A ridge 140 extends outwardly from the generally flat face portion 125 and 135. In lieu of the plurality of circular sealing extensions, the second jaw 130 has a solid bar 145 extending outwardly from the generally flat face portion 135 in a region disposed above the ridge 140. To achieve the same goal of providing a seal that is more easily opened at the opening end 90 than the closed end 95 of the gabled top, the solid bar 145 and the ridges taper to a diminished degree of extension in the regions 150 and 155.

Although the present invention has been described with reference to specific embodiments, those of skill in the art will recognize that changes may be made thereto without departing from the scope and spirit of the invention as set forth in the appended claims.

I claim as my invention:

1. A device for sealing the fin of a gabled container, the, gabled container having a pair of inclined panels joining the fin at a base of the fin, the device comprising:

a) a first jaw having a generally flat face portion, the first jaw further having a tapered ridge extending from the generally flat face portion lengthwise along at least a portion of the generally flat face portion thereof, the tapered ridge being disposed at a lower portion of the first jaw and tapering outwardly from the generally flat face portion; and b) a second jaw disposed opposite and movable toward the first jaw to a closed position, the second jaw having a generally flat face portion, the second jaw further having a sealing member extending from a mid-portion of the second jaw and a tapered ridge extending from the generally flat portion lengthwise along at least a portion of the generally flat face portion of the second jaw, the tapered ridge being disposed at a lower portion of the second jaw and tapering outwardly from the generally flat face portion of the second jaw toward the tapered ridge of the first jaw, the tapered ridges of each of the first and second jaws positioned to engage the base of the fin of the gabled container for forming a base fin crease at the junction between the fin and the inclined panels, the degree to which the tapered ridges extend from the respective generally flat face portions being less than the degree to which the sealing member extends from the generally flat face portion of the second jaw thereby causing the tapered ridges to apply less pressure to the fin than is applied by the sealing member when the first and second jaws are in the closed position.

2. A device for sealing a fin of a gabled container as claimed in claim 1 wherein the tapered ridge of each of the first and second jaws further tapers to a diminished extension near an opening end of the gabled container.

3. A device for sealing as claimed in claim 1 wherein the tapered ridge of each of the first and second jaws has a generally trapezoidal cross-section.

4. A device for sealing as claimed in claim 1 wherein the sealing member comprises a plurality of generally circular extensions extending from the generally flat face portion of the second jaw lengthwise along at least a portion of the generally flat face of the second jaw for sealing the fin of a gabled top container with ultrasonic energy.

5. A device for sealing as claimed in claim 4 wherein the plurality of generally circular extensions of the second jaw taper to a diminished degree of extension near the opening end of the gable container.

6. A device for sealing the fin of a gabled container, the gabled container having a pair of inclined panels joining the fin at a base of the fin, the device comprising:

a) a first jaw having a generally flat face portion, the first jaw further having an outwardly tapered ridge extending from the generally flat face portion lengthwise along at least a portion of the generally flat face portion thereof, the tapered ridge being disposed at a lower portion of the first jaw and tapering from the generally flat face portion; and b) a second jaw disposed opposite and movable toward the first jaw to a closed position, the second jaw having a generally flat face portion, the second jaw further having a sealing member extending from a mid-portion of the second jaw and an outwardly tapered ridge extending from the generally flat portion lengthwise along at least a portion of the generally flat face portion of the second jaw, the tapered ridge being disposed at a lower portion of the second jaw and tapering from the generally flat face portion of the second jaw and extending toward the tapered ridge of the first jaw, the tapered ridges of each of the first and second jaws positioned to engage the base of the fin of the gabled container for forming a base fin crease at the junction between the fin and the inclined panels, the tapered ridges applying less pressure to the fin than is applied by the sealing member when the first and second jaws are moved to the closed position.

7. A device for sealing a fin of a gabled container as claimed in claim 6 wherein the tapered ridge of each of the first and second jaws further tapers to a diminished extension near an opening end of the gabled container.

8. A device for sealing as claimed in claim 6 wherein the tapered ridge of each of the first and second jaw has a generally trapezoidal cross-section.

9. A device for sealing as claimed in claim 6 wherein the sealing member comprises a plurality of generally circular extensions extending from the generally flat face portion of the second jaw lengthwise along at least a portion of the generally flat face of the second jaw for sealing the fin of a gabled top container with ultrasonic energy.

10. A device for sealing as claimed in claim 9 wherein the plurality of generally circular extensions of the second jaw taper to a diminished degree of extension near the opening end of the gable container.

11. A device for sealing as claimed in claim 10 wherein the plurality of generally circular sealing extensions extends a greater distance from the generally flat face portion of the second jaw compared to the distance the tapered ridge of the second jaw extends from the generally flat face portion of the second jaw thereby to effect the pressure difference when the first and second jaws are in the closed position.

* * * * *

UNITED STATES PATENT AND TRADEMARK OFFICE
CERTIFICATE OF CORRECTION

PATENT NO. : 5,564,255
DATED : October 15, 1996
INVENTOR(S) : Peter Giacomelli

It is certified that error appears in the above-indentified patent and that said Letters Patent is hereby corrected as shown below:

Title page, item [56], References Cited, U.S. Patent Documents, change 4,403,465 from "Basche" to -- Bachner --.

IN COLUMN 1, LINE 37

Cancel "canon" and insert --carton-- therefor.

IN COLUMN 1, LINE 46

Cancel "Braveris et al." and insert --Bruveris-- therefor.

IN COLUMN 4, LINE 29

Please cancel the second ",".

Signed and Sealed this

Third Day of June, 1997

*Attest:*

BRUCE LEHMAN

*Attesting Officer*  *Commissioner of Patents and Trademarks*